United States Patent [19]
Kaule

[11] 3,741,334
[45] June 26, 1973

[54] METHOD AND APPARATUS FOR MEASURING THICKNESS BY EXCITING AND MEASURING FREE RESONANCE FREQUENCY

[75] Inventor: Walter Kaule, Cologne-Dellbruck, Germany

[73] Assignee: Dr. J. M. H. Krautkramer, Gesellschaft fur Elektrophysik, Cologne-Klettenberg, Germany

[22] Filed: May 21, 1971

[21] Appl. No.: 145,618

[52] U.S. Cl............... 181/0.5 NP, 73/67.9, 73/67.2
[51] Int. Cl. ............................................. G01n 29/00
[58] Field of Search .................. 181/.5 NP, .5 AP, 181/.5 R; 73/67.2, 67.9

[56] References Cited
UNITED STATES PATENTS

| | | | |
|---|---|---|---|
| 3,595,069 | 6/1971 | Fowler | 73/67.2 |
| 3,120,120 | 2/1964 | Worton | 73/67.2 |
| 3,623,358 | 11/1971 | Sugimoto | 73/67.2 |

*Primary Examiner*—Robert F. Stahl
*Assistant Examiner*—J. V. Doramus
*Attorney*—Mattern, Ware and Davis

[57] ABSTRACT

The ultrasonic frequency of the thickness mode free resonance of plates or sheets is measured to precisely determine their thickness. The thickness free resonance is the natural frequency of vibration of the plate or sheet in the thickness mode when the same is not influenced by contact probes or the like and is not subject to the application of external energy. The free resonance is induced by first subjecting the portion of the article to be measured to a noise source for a first time interval; thereafter picking up the free resonance ultra sound produced by the article; storing the decaying sound; and, after the article has ceased resonating, feeding back the decaying sound to the sheet to induce high amplitude resonant vibrations therein; stopping the feed-back after a short interval; allowing the resonance to decay in its natural mode; again picking up and storing the decaying resonant frequency sound produced by the article; after resonance has ceased, again feeding back the decaying resonant frequency sound to the sheet; and so forth repetitively. Sound frequency meters are employed for measuring the frequency of the sound produced by the article when it is not being excited, i.e., when the resonance is decaying in its natural mode.

Apparatus provided by the invention comprises a liquid coupling medium in which the sheet or plate is immersed; an ultrasonic transducer for radiating ultrasound to the article; a second ultrasound transducer for picking up the resonant sound produced by the article; appropriate amplifiers; and a delay line in the form of a rotating magnetic recording apparatus for recording the decaying resonant frequency and, after the resonance has died out, feeding the same back through the irradiating transducer. Alternative apparatus locates the transducer ten centimeters away from an article to provide inherent delay in the transmission path to and from the article and comprises an electronic switch connecting the two ultrasonic transducers, and amplifiers in a feed-back loop with the article, the excitation being applied only at intervals greater than the decay period of the article's resonance. Also disclosed is an auxiliary ultrasonic pulse echo system for measuring transmission distance from the transmitting transducer to the article plate and for controlling the electronic switch accordingly.

20 Claims, 6 Drawing Figures

PATENTED JUN 26 1973

INVENTOR.
WALTER KAULE

BY

MATTERN WARE AND DAVIS
ATTORNEYS

METHOD AND APPARATUS FOR MEASURING THICKNESS BY EXCITING AND MEASURING FREE RESONANCE FREQUENCY

SUMMARY OF THE INVENTION

This invention relates to a method and apparatus for measuring thickness by exciting and measuring free resonance frequency.

Natural vibrations can be excited in a plate or sheet along the thickness dimension of the plate or sheet. The thickness is directly related to the frequency of this thickness resonance. Thus, instruments have been provided by the prior art for measuring the thickness by means of this resonant ultrasonic method. One method according to the prior art is to excite the thickness resonance by irradiating the plate or sheet ultrasonically with a range of ultrasonic frequencies, that is by wobbling the irradiating sound frequency electronically. At the instant the irradiating sound frequency corresponds to the thickness resonant frequency of the plate or sheet, the plate or sheet is excited and it vibrates naturally. This phenomenon is known as thickness resonance. There are two methods according to the prior art for determining the frequency of this thickness resonance.

According to the first, the ultrasonic transducer is in close contact with the plate or sheet being measured. When the resonant frequency is reached, the plate or sheet absorbs more energy from the transducer than at other frequencies and the load on the electrical apparatus driving the transducer increases. This prior art apparatus electronically determines at which sound frequency this increase in load occurs and the thickness of the plate is then derived from this measured resonant frequency. This method has an inherent disadvantage. The required close contact between the plate or sheet being measured and the ultrasonic transducer exerts a mechanical load on the sheet or plate. Thus, the measured element no longer vibrates freely and its resonant frequency is raised slightly. Furthermore, the increase in resonant frequency depends on the degree of coupling between the measuring transducer and the plate or sheet under test. When an attempt is made to increase sensitivity, by closely coupling the transducer to the plate, the amount of error induced by loading the plate is increased.

The second method according to the prior art employes two ultrasonic transducers coupled through a liquid medium, usually water, to the measured element. One of the ultrasonic transducers is a transmitter and one is a receiver. At the thickness resonance, the plate or sheet being measured radiates far more energy than when driven off its resonant frequency. This reradiated energy is eight times higher than that produced off resonance. From this resonance factor, the resonant frequency may be determined. That is, when the ultrasonic receiver receives the most energy the plate or sheet is being excited by the transmitter at its resonant frequency. The spacing between the ultrasonic transducers and the plate or sheet have no influence on this measurement. The accuracy of this method depends upon how accurately the apparatus can measure the resonant frequency.

Unfortunately, there are two other fundamental sources of error in the above prior art methods of ultrasonically measuring thickness. The first is the inherent difficulty in measuring a resonant frequency. As illustrated in FIG. 1, as the exciting frequency is varied about the resonance, the load on the exciting transducer or the reradiated sound increases in amplitude as indicated. If the plate has highly polished sides and is freely suspended in air, the slope of the resonance curve as indicated at 1 will be quite great. However, if the surface is rough or if the plate or sheet is immersed in a liquid medium according to one of the methods, the resonance will be less sharp, as indicated by resonance curve 2. If the sheet or plate has a rough surface and is immersed in a liquid, the resonance will be very wide, as indicated by curve 3. It is quite difficult electrically to determine the exact peak, such as peak M of such resonance curves. This produces errors in the prior art measuring systems. In fact, prior measuring systems mostly look toward the sharply rising lower frequency slope of the resonance curve itself. Thus, under the conditions illustrated by curve 3, a large error in measurement is introduced.

A third method according to the prior art eliminates this source of error. This is accomplished by feeding back to the plate the appropriately amplified ultrasound reradiated by the vibrating plate or sheet. This causes the plate or sheet to continuously vibrate at its natural thickness resonant frequency. Thus, the plate or sheet itself becomes a frequency determining member. It automatically resonates at the peak M of its resonance curve, that is at the resonant frequency. This is only true when the driving ultrasound applied to the plate or sheet is exactly in phase with the resonant vibrations in the plate. FIG. 2 shows a natural resonance curve and a second S-shaped curve showing the variation of resonant frequency with the phase of the driving ultrasound superimposed thereon. This variation of resonant frequency with phase is analogous to the way one can cause a swing to move faster than its natural pendulum-like motion, by pushing it before it reaches its highest normal position, that is, by driving it out of phase with its natural resonant swinging motion. Thus, when measuring the thickness of plates, using the feedback methods illustrated in FIG. 3, the transmitting probe 15a and the receiving prove 11 must be hard against the plate 10 and no phase shift or an integral multiple of 180° phase shift must be introduced by amplifier 12 in order that the plate be driven at its natural thickness resonant frequency. However, the method still provides an error as previously described, due to the close coupling of the transducers to the plate or sheet under test, which varies the natural resonant frequency. On the other hand, if the probes are decoupled from the plate or sheet, that is separated from it by a certain distance, phase shift will be introduced because of the time it takes the ultrasound to travel from the transducer to the plate or sheet, This time-phase displacement or phase shift is very hard to control, and leads to uncontrolled errors in the measurement.

OBJECTS OF THE INVENTION

Therefore, an object of the invention is to improve the art of ultrasonically measuring the thickness of plates or sheets.

Another object of the invention is to provide a method for exciting a completely free resonance in an object for the purpose of measuring a quality of the object.

Still another object of the invention is to provide apparatus for carrying out methods of the above character.

Yet another object of the invention is to provide apparatus of the above character that is self-calibrating, simple, inexpensive to manufacture, and convenient to operate.

Other objects of the invention will in part be obvious and will in part appear hereinafter.

The invention accordingly comprises the several steps and the relation of one or more of such steps with respect to each of the others, and the apparatus embodying features of construction, combinations of elements and arrangements of parts which are adapted to effect such steps, all as exemplified in the following detailed description, and the scope of the invention will be indicated in the claims.

THE DRAWINGS

For a fuller understanding of the nature and objects of the invention, reference should be had to the following detailed description, taken in connection with the accompanying drawings, in which.

The same reference characters refer to the same elements throughout the several views of the drawings.

Figure 1:
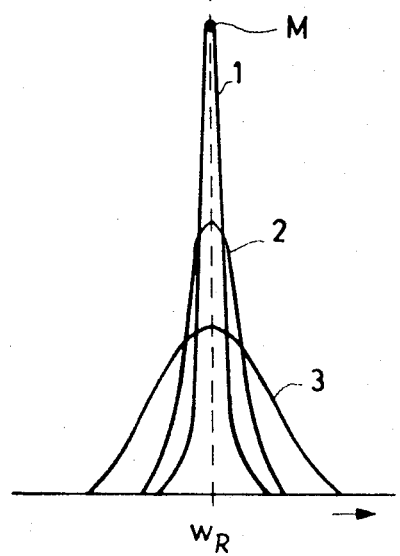
FIG. 1 is a plot of frequency v. amplitude resonance curves characteristic of the thickness resonances of plates or sheets.
Figure 2:
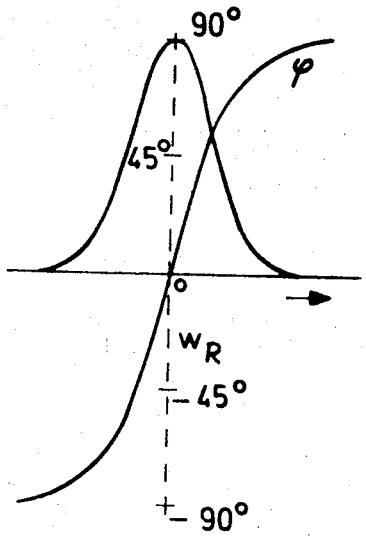
FIG. 2 is a superimposed plot of frequency versus amplitude, and frequency versus phase shift, characteristic of thickness resonances of plates and sheets.
Figure 3:
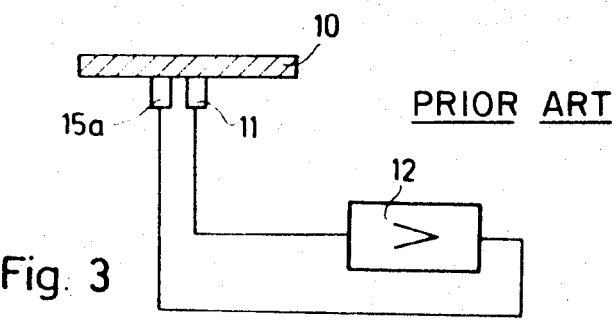
FIG. 3 is an electrical block diagram of apparatus according to the prior art for ultrasonically measuring the thickness of plates and sheets.

In order to eliminate errors introduced into the measurement when using the prior art systems illustrated in FIG. 3, which are due to the change in resonant frequency depending upon the phase angle of the fedback driving signal; according to the present invention the plate or sheet is caused to vibrate at its resonant frequency, then the excitation is removed. The vibrations in the then freely vibrating object of course are damped by the surrounding medium, and internally, and die out. According to the invention, the frequency of these dying or decaying resonant vibrations is measured. Furthermore these vibrations are delayed and fed back to the transmitting ultrasonic transducer after having been delayed for a time greater than that required for the resonant vibrations to die out in the unexcited plate or sheet. That is, resonant vibrations are excited in the object being tested by a pulse triggered transducer, the resulting decaying, free resonant vibrations from the object are picked up by a receiving transducer and fed back after a fixed delay to the transmitting transducer. The delay may be introduced according to the invention in two ways. Either a delay line is introduced between the receiving transducer and the transmitting transducer, or in another embodiment of the invention, the transducers are located far enough away from the object being tested to introduce a transmission delay greater than the duration of decaying free vibrations in the article under test.

Figure 4:
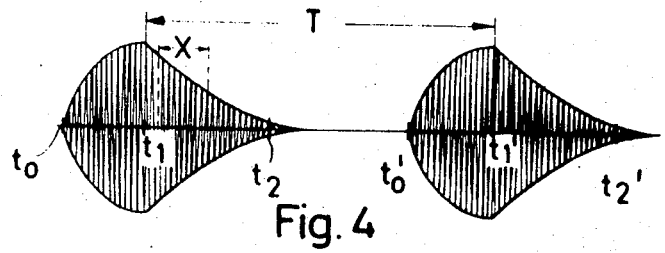
FIG. 4 is a timing diagram illustrating the method of the present invention.

Thus, one embodiment of the invention provides a rotating magnetic recording medium as the delay line between an output amplifier and an input amplifier to and from the receiving and transmitting transducers respectively. Another embodiment of the invention locates the receiving and transmitting transducers ten centimeters or more away from (for example) a metal plate. In this embodiment of the invention, an electronic switch directly feeds back the signal from the receiving transducer to the transmitting transducer to excite the plate. The switch is then opened for longer than the decay time of the induced natural resonant vibrations, then closed again in time to feed back the decaying natural resonance frequency picked up by the receiving transducer to again excite the natural resonance frequency of the plate. The electronic switch is then opened and the process repeated to cause repetitive ringing of the article under test, as illustrated in FIG. 4. This apparatus is preferably provided with an auxiliary pulse echo system for determining the time it takes the ultrasound to travel from the transmitting transducer to the plate and back to the receiving transducer, this transit time being used to calibrate the electronic switch. Conventional digital, or analog frequency meters calibrated in thickness are provided for thickness testing.

SPECIFIC DESCRIPTION

More specifically and referring to FIG. 4, at time $t_0$, a plate 10, for example, is excited at its thickness resonant frequency. The amplitude of the vibrations in the plate will build up and reach a maximum after a certain time. When excitation of the plate is discontinued at time $t_1$, as shown in FIG. 4, the plate 10 will continue to vibrate at its natural frequency, its free resonance, until the vibrating energy is dissipated at time $t_2$ due to internal and external damping. Within the period $t_1$ to $t_2$, the plate vibrates freely at its exact natural frequency in the manner of a struck tuning fork.

Figure 5:
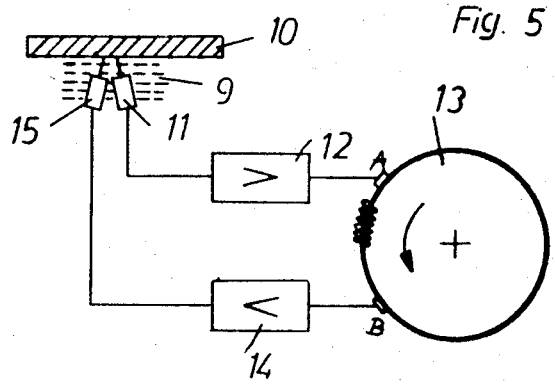
FIG. 5 is an electrical block diagram of apparatus for carrying out the method illustrated in FIG. 4; and, FIG. 6 is an electrical block diagram of alternative apparatus for carrying out the method illustrated in FIG. 4.

Now, referring to FIG. 5, apparatus for causing a plate 10 to vibrate as shown in FIG. 4 comprises amplifier 14 for amplifying signals at or near the resonant frequency and for supplying the same to irradiating transducer 15. Ultrasonic vibrations pass through, for example, a water coupling medium 9 to excite the plate 10. Sound vibrations re-radiated from the plate are picked up by an electronically triggered receiver 11 only within the period $t_1$ to $t_2$. Transducer 11 converts them into electrical vibrations which are amplified by amplifier 12 and after a fixed delay applied to amplifier 14. As shown in FIG. 5, this delay may be provided by, for example, recording the electrical vibrations on a rotating magnetic drum 13 at a magnetic recording head A. A considerable time delay is provided before the recording reaches playback head B. The recorded vibrations from the previous excitation are amplified by amplifier 14 and supplied via irradiating transducer 15 to re-excite the plate 10 as illustrated for the duration $t_0'$ through $t_1'$ in FIG. 4. At the instant $t_1'$, the stored frequency from the previous excitation is used up due to the opening of the electronic switch (not shown) associated with amplifier 12, and acoustical excitation of the plate 10 is thus discontinued. The plate continues to ring at its free natural resonant frequency, from times $t_1'$ to $t_2'$. The electronic switch associated with amplifier 12 is closed during this time and this free ringing is recorded again on drum 13 at write head A and, after a delay equal to the time T between time $t_0$ and time $t_0'$ or times $t_1$ and $t_1'$, is reapplied to the plate 10. This feedback delay Time T is chosen to be very long with respect to the period $t_1$ to $t_2$ of the decaying vibrations in the plate 10 so that there is no chance that the plate will be excited with acoustical vibrations out of phase with the natural vibrations therein. Thus, there is no chance that a phase shift will introduce a phase error in the frequency of vibration of the plate. With the apparatus of FIG. 5 one needs only to measure frequency of the decaying vibrations by means well known in the prior art to know the resonant natural thickness of the plate 10 without error.

Figure 6:
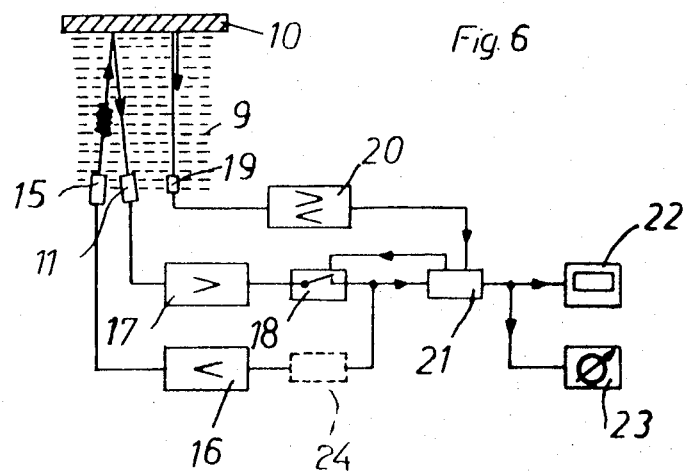

The delay line provided by the magnetic drum 13, or by other means known in the art, may be eliminated when apparatus such as that illustrated in FIG. 6 is employed in carrying out the invention. The time delay is obtained by the apparatus of FIG. 6 in a simple way by arranging the sound transmitter 15 and the receiver 11 a far distance from the plate 10. In practice with metal plates, this is approximately 10 centimeters. Alternatively, an ultrasonic delay line could be employed in association with the transducers 15 and 11, which could then be located close to the plate 10.

The plate 10 is initially started to vibrate by the inherent noise produced by high gain amplifier 16. The transducer 15 irradiates the plate 10 with ultrasound comprising a broad range of frequencies. The plate itself, acting as a filter, starts vibrating at its natural frequency at a very low amplitude. These low amplitude vibrations are picked up by the receiver 11, and amplified in amplifier 17. An electronic switch 18 closes when the vibrations occur during period $t_1$ through $t_2$ are picked up. These ringing vibrations of the plate 10 are fed back via amplifier 16 to the transmitter 15. During the second excitation from period $t_0'$ to time $t_1'$, the plate is excited at or near its natural resonant frequency. The amplitude of vibrations in the plate 10 quickly builds up to a maximum. This cycle is repeated as many times as required for the measurement.

The cycle for triggering the electronic switch 18 must approximately coincide with the feedback delay time T, illustrated in FIG. 4. As illustrated in FIG. 6, this must be the time it takes the ultra-sound to travel from the transmitter probe 15 to the plate 10 and back to the receiver probe 11, the "delay distance."

This delay distance is preferably measured and controlled by a pulse echo arrangement comprising transmitter-receiver transducer probe 19, and associated amplifiers 20. An echo pulse received at probe 19 is immediately retransmitted and also used to trigger an electronic counter switch 21, which in turn immediately closes the electronic switch 18. The electronic counter switch 21 then counts the vibrations received from the plate 10 via receiver transducer 11. For example, the electronic counter switch may be set to count to a total of 16 vibrations. After the 16th vibration, it opens the electronic switch 18. In this way, only a portion X (see FIG. 4) of the decaying vibrations of the plate are amplified and fed back. This portion X contains vibrations of high enough amplitude to re-excite the plate 10 in the next cycle.

In order to determine the resonant frequency of the freely vibrating plate during the selected period X, the electronic counter switch 21 provides to a digital counter 22 or an analog indicator 23, or both, a start pulse at, for example, the 7th vibration and at the 16th vibration, for example, a stop pulse. The time between these pulses can be measured in known ways by the digital counter 22 or the analog indicator 23 and is proportional to the frequency of vibration of plate 10, and thus to the thickness of the plate 10. The meters of the indicator instruments can, as is well known in the prior art, produce a direct measurement in terms of thickness. It will be noted that, as described, the instrument provides 10 cycles of free resonance, the seventh to the 16th cycle, for measurement. This assures a high degree of measurement accuracy of frequency. The reason earlier vibrations are not used is that when the plate 10 is vibrating at maximum, amplitude amplifier 17 may be overloaded, creating erroneous signals for the electronic counter 21.

Those skilled in the art will understand that a single transducer for both transmitting and receiving can be substituted for the two transducers 15 and 11 of FIGS. 5 and 6. The delay may be provided by probe transmission delay, as shown in FIG. 6, by an electrical or an ultrasonic delay line 24 within the feedback circuit or by an ultrasonic delay line or lines directly associated with the probes 11 and 15. Furthermore, the plate 10 need not be excited or observed acoustically; it may be excited or observed magneto-strictively or magneto-inductively, which is quite desirable where it is not desired to immerse the plate in a liquid coupling media 9, as illustrated in FIGS. 5 and 6. This dry method preferably employs transducers close to the plate 11, and an internal delay means within the electronic measuring instrument itself.

Those skilled in the art will also realize that the method is applicable where it is desired to excite and observe the free resonant frequency of anything, whether it be for an ultrasonic resonance test or what have you.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. The method of exciting a free natural resonance comprising applying excitation at or near the frequency of said free natural resonance, allowing the amplitude of said free natural resonance to build under the influence of said excitation, terminating said excitation, feeding back the decaying natural resonant frequency of said decaying resonance as further excitation after the amplitude of said resonance has decayed to zero to cause a series of independent ringings of said resonance.

2. The method defined in claim 1 and the further step of measuring the decaying free natural resonance frequency of said natural resonance during at least one of said ringings.

3. The method defined in claim 2, wherein said excitation is ultrasonic.

4. The method of ultrasonically testing an object comprising:
   A. picking up the decaying resonant vibrations of an object being tested;
   B. delaying the picked up vibrations over a period of time substantially equal to or greater than the vibrations's decay period; and,
   C. feeding back said time delayed decaying resonant vibrations to the object under test as excitation.

5. The method defined in claim 4 and the additional steps of
   D. measuring the frequency of said decaying resonant vibrations.

6. Ultrasonic testing apparatus comprising:
   A. a pick up transducer for converting the resonance vibrations of an object under test into electrical oscillations and supplying the same as an output;
   B. an exciting transducer having an input and for converting electrical oscillations supplied to said input into resonance stimulating vibrations in the object under test;
   C. delay means; and,
   D. an electronic switch for connecting the output of said pickup transducer to the input of said exciting transducer in a feedback arrangement to feedback to said exciting transducer only the decaying resonant vibrations in the object under test after the object under test has ceased resonating from the previous excitations.

7. Apparatus as defined in claim 6 wherein said delay means is a delay line in the feedback circuit.

8. Apparatus as defined in claim 7 wherein said delay line is a electrical delay line.

9. Apparatus as defined in claim 7 wherein said delay line is an ultrasonic delay line.

10. Apparatus as defined in claim 7 wherein said transducers comprise a unitary by-directional ultrasonic transducer.

11. Apparatus as defined in claim 6 wherein said delay means is a recirculating memory in the feedback circuit.

12. Apparatus as defined in claim 6 wherein said transducers are ultrasonic sound transducers.

13. Apparatus as defined in claim 6 wherein said transducers comprise coils magnetically coupled to the object under test.

14. Apparatus as defined in claim 12 wherein said delay means is an ultrasonic sound transmission path between at least one of said transducers and the object under test.

15. Apparatus as defined in claim 14 wherein said delay means is a transmission medium in which said transducers and the object under test are immersed.

16. Apparatus as defined in claim 15; and:
   E. an ultrasonic pulse echo system for measuring the distance between said transducers and the object under test and for controlling said electronic switch.

17. Apparatus as defined in claim 16 wherein said pulse echo system bounces a pulse continuously back and forth between said transducers and the object under test and controls said electronic switch according to the pulse echo repetition rate.

18. Apparatus as defined in claim 17 wherein said electronic switch comprises a counter responsive to said pulse echo system and the decaying resonant vibrations picked up by said pick up transducer to feed back only a predetermined portion of said decaying resonant vibrations.

19. Apparatus as defined in claim 18, and:
   F. time interval measuring apparatus responsive to signals from said counter, and wherein said counter supplies a start pulse to said measuring apparatus and then counts a predetermined number of said decaying resonant vibrations and then produces a stop pulse.

20. The method defined in claim 1 further defined in that said applying step comprises initially applying noise excitation having a broad frequency spectrum including that of the free natural resonance.

* * * * *